Mar. 6, 1923.

J. D. ELMS

LENS FOCUSING DEVICE

Filed July 23, 1921

1,447,173

Inventor
John D. Elms
By
his Attorney

Patented Mar. 6, 1923.

1,447,173

UNITED STATES PATENT OFFICE.

JOHN D. ELMS, OF WEST NEW BRIGHTON, NEW YORK, ASSIGNOR TO WIDESCOPE CAMERA CO., OF NEWARK, NEW JERSEY, A CORPORATION OF NEW JERSEY.

LENS-FOCUSING DEVICE.

Application filed July 23, 1921. Serial No. 486,951.

*To all whom it may concern:*

Be it known that I, JOHN D. ELMS, a citizen of the United States, residing at West New Brighton, in the county of Richmond, borough of Richmond, city and State of New York, have invented new and useful Improvements in Lens-Focusing Devices, of which the following is a full, clear, and exact specification.

My invention relates to lens focusing devices and refers particularly to devices capable of simultaneously focusing a plurality of divergent lenses.

In the taking of widescope photographs, in which it is desired to photograph abutting views upon a plurality of plates, or films, it is necessary that the plurality of lenses should be divergent with respect to each other and so positioned that their optical centers are in vertical alignment with each other.

It is further requisite that the optical axis of each lens be at right angles to its photographic plate, or film, and hence these plates, or films, will be at divergent angles with respect to each other.

It is evident that, in the production of widescope pictures, as above described, it is essential that all of the plurality of lenses be in absolute focus upon their respective plates, or films, and that the independent focusing of each lens requires a considerable amount of time and causes the possibility of non-uniformity of focusing, thus rendering the plurality of photographs non-uniform in clearness and precision.

It is to be further noted that, as the optical axes of the different lenses are not in parallelism with respect to each other, the movement of each lens, for purposes of focusing, must not be in the same plane as the remainder of the lenses.

The device of my invention overcomes all of the difficulties of the individual and independent focusing of each of a plurality of divergent lenses and presents a means whereby all of a plurality of divergent lenses can be simultaneously and accurately focused upon a purality of photographic plates, or films.

In the accompanying drawings, illustrating one form of the device of my invention, similar parts are designated by similar numerals.

Figure 1:
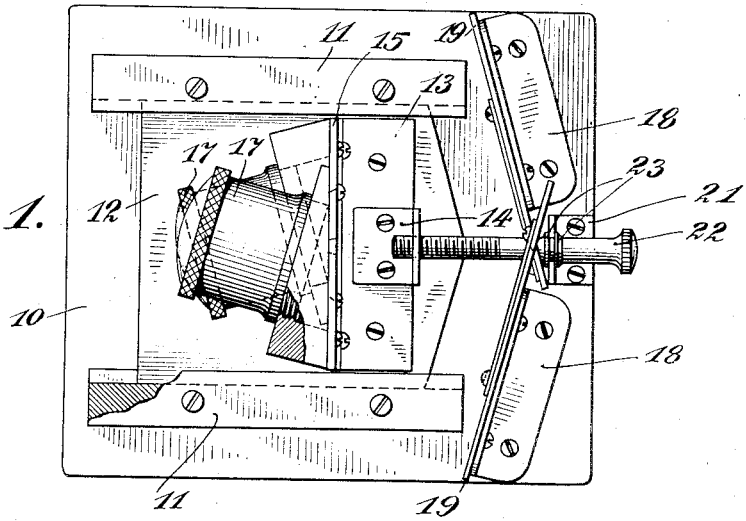
Figure 1 is a top plan view of one form of my device.
Figure 2:
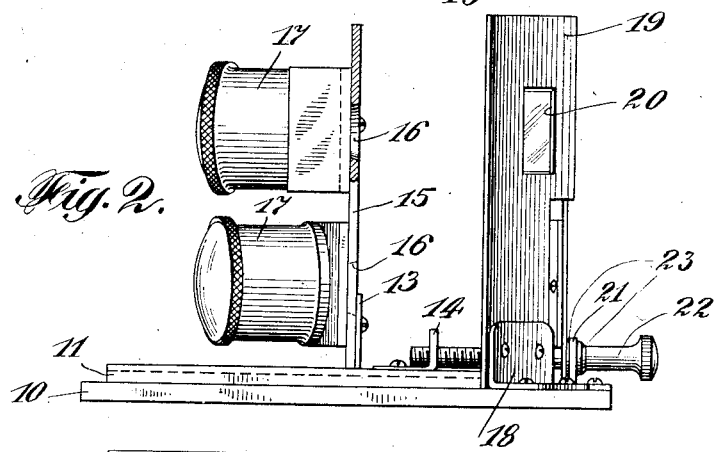
Figure 2 is a side view of Figure 1.
Figure 3:
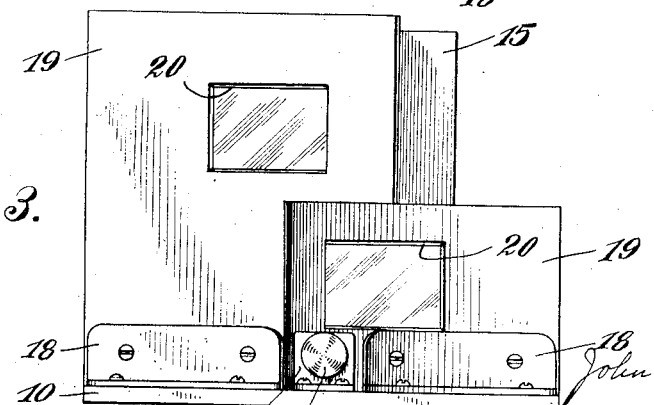
Figure 3 is a back view of Figure 1.

The particular form of the device of my invention, shown in the accompanying drawings, comprises the camera bed-plate 10, to which are fixedly attached the two U-shaped guide members 11, 11, the upper and lower sides of the guide members being spaced from each other for purposes described hereafter. Slidable within the spaces between the sides of the guide members, 11, 11, is a platform 12, to which is fixedly attached the right-angled plate 13, and to the latter, the right-angled plate 14 is fixedly attached. Fixedly attached to the upperly extended portion of the plate 13 is a lens-supporting plate 15 having apertures 16, 16 therein for the passage of light rays passing through lenses carried by the divergent lense holders 17, 17. The divergent lens holders 17, 17 are so positioned with respect to each other that the optical centers of their respective lenses are in vertical alignment with each other.

Fixedly attached to the camera base 10 are two right-angled plates 18, 18, to which are attached the two upright screens 19, 19, in each of which is an opening, or window 20, these windows being so positioned as to allow the light rays passing through the lenses to impinge at right angles upon photographic plates, or films, behind the screens 19, 19.

A right-angled plate 21 is fixedly attached to the camera bed-plate 10 and a threaded bolt 22 passes through a hole in the plate 21, holes in the screens 19, 19 and threads within a threaded hole in the plate 14. The bolt 22 has the two fixedly attached washers 23, 23 one on each side of the plate 21.

The lens holders 17, 17 are so positioned upon the supporting plate 15 that the optical axis of each lens is at right angles to its screen 19 and is centered with respect to its opening 20, and thus light passing through the lenses, will impinge at right angles upon photographic plates, or films, behind, and parallel to, the screens 19, 19.

If now the threaded bolt 22 be revolved, the slidable platform 12 will be moved away from, or towards, the screens 19, 19, and each lens carried thereby will be moved equally with respect to its film as is the other lens with respect to its film.

It will thus be seen that the revolution of the bolt 22 will simultaneously focus both divergent sets of lenses upon their respective photographic plates, or films.

I do not limit myself to the particular size, shape, number or arrangement of parts, as shown and described, all of which may be varied without going beyond the scope of my invention, as shown, described and claimed.

What I claim is:—

1. A lens focusing device, which comprises, a slidable platform, a plurality of divergent lenses carried by said platform, a photographic film screen at right angles to the optical axis of each lens and having an opening to admit light rays passing through its lens and means whereby the plurality of lenses can be simultaneously moved equally with respect to their respective screens.

2. A lens focusing device, which comprises, a slidable platform, a plurality of divergent lenses having their optical centers in vertical alignment with each other carried by said platform, a photographic film screen at right angles to the optical axis of each lens and having an opening to admit light rays passing through its lens and means whereby the plurality of lenses can be simultaneously moved equally with respect to their respective screens.

3. A lens focusing device, which comprises, a camera bed-plate, a plurality of guides carried by the bed-plate, a platform slidable within the guides, a plurality of divergent lenses carried by the platform, a photographic film screen at right angles to the optical axis of each lens carried by the bed-plate and having an opening to admit light rays passing through its lens and means whereby the plurality of lenses can be simultaneously moved equally with respect to their respective screens.

4. A lens focusing device, which comprises, a camera bed-plate, a plurality of guides carried by the bed-plate, a platform slidable within the guides, a plurality of divergent lenses having their optical centers in vertical alignment with each other carried by the platform, a photographic film screen at right angles to the optical axis of each lens carried by the bed-plate and having an opening to admit light rays passing through its lens and means whereby the plurality of lenses can be simultaneously moved equally with respect to their respective screens.

5. A lens focusing device, which comprises, a slidable platform, a plurality of divergent lenses having their optical centers in vertical alignment with each other carried by the platform, a photographic film screen at right angles to the optical axis of each lens and having an opening to admit light rays passing through its lens and means whereby the optical centers of the lenses can be simultaneously moved equally with respect to their respective screens.

6. A lens focusing device, which comprises, a camera bed-plate, a plurality of guides carried by the bed-plate, a platform slidable within the guides, a plurality of divergent lenses having their optical centers in vertical alignment with each other carried by the platform, a photographic film screen at right angles to the optical axis of each lens carried by the bed-plate and having an opening to admit light rays passing through its lens and means whereby the optical centers of the lenses can be simultaneously moved equally with respect to their respective screens.

Signed at New York city in the county of New York and State of New York this 1st day of July, 1921.

JOHN D. ELMS.